United States Patent [19]

Sato et al.

[11] 3,857,981

[45] Dec. 31, 1974

[54] PRESERVING RED COLOR IN RED MEATS

[75] Inventors: Kunito Sato, Chicago; Harold K. Herring, Wheaton, both of Ill.

[73] Assignee: Armour and Company, Chicago, Ill.

[22] Filed: June 20, 1973

[21] Appl. No.: 371,750

[52] U.S. Cl.................. 426/265, 426/224, 426/264
[51] Int. Cl.............................................. A23b 1/00
[58] Field of Search ........... 426/175, 212, 262, 265, 426/370, 371, 224, 264; 99/107, 157

[56] References Cited
UNITED STATES PATENTS 3,477,859  11/1969  Brown et al. ...................... 426/265
3,597,236  8/1971  Hopkins et al...................... 426/265

Primary Examiner—Hyman Lord
Attorney, Agent, or Firm—Frank T. Barber; Carl C. Batz

[57] ABSTRACT

Red meats having incorporated therein for the purpose of preserving the bright red color thereof, 5-hydroxy-2-(hydroxymethyl)-4-pyrone, and processes and procedures for preparing and handling such meats.

7 Claims, No Drawings

PRESERVING RED COLOR IN RED MEATS

This invention relates to processes for preserving the bright red color of red meats and to red meat products which are resistant to color change.

It is well known that although meats such as beef, pork, lamb and the like have a bright red color shortly after cutting or grinding, this color soon fades on exposure to the atmosphere and to light. This change in color does not mean that there has been any bacterial action or spoilage and the discolored meat is just as wholesome and just as nutritious as it is when cut, but after exposure to the atmosphere and light, which necessarily takes place in marketing, the meat is somewhat less attractive than would be desirable.

The red meats shortly after cutting or grinding have a bright red color. Then after a time the brightness begins to fade and the color changes to a reddish brown, then to a brownish red, then to brown and finally to a dark brown. Pork sausage is known to have a relatively rapid color change under the usual refrigerated storage conditions, especially if exposed to light, as it must be if it is displayed in marketing.

It is therefore a principal object of this invention to provide red meat which is resistant to such color change and which will retain for a longer time the bright red color which red meat normally has when first cut and is exposed to air. A further object is to discover a process for providing red meats resistive to this color change which process is effective and practical, and in no way harmful to the meat. Other objects will be apparent as this specification proceeds.

SUMMARY OF THE INVENTION

We have discovered a compound which when incorporated in red meat will cause the meat to be resistant to color change. This compound is one of the pyrone compounds the chemical name of which is 5-hydroxy-2-(hydroxymethyl)-4-pyrone which sometimes has been called kojic acid. When this compound is incorporated into red meat at a minimum level of about 0.01 percent by weight of the meat, the resulting meat is found to keep its bright red color for a longer time and to resist change to a brown or dark brown color.

DETAILED DESCRIPTION

The present invention is applicable to all meats of the type classed as red meats. This includes beef, pork and lamb, and the meat of other meat animals which has a red color. The red meat animals are distinguished from poultry, for example, which has meat of a light pink color not ordinarily classed as red. The red color is believed to be closely associated with the protein's myoglobin of the muscle and the hemoglobin of the blood, and hemoglobin may exist in many forms.

The red meat is made up of lean meat, which contains proteins such as myoglobin and hemoglobin; water and fat. The fat is believed not to have any part in the change in color from the initial bright red color, of the meat, but may have a substantial role in the development of rancidity or off flavors.

The chemical structure of this compound is illustrated by the following structural formula:

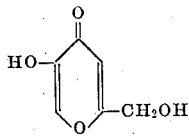

5-hydroxy-2-(hydroxymethyl)-4-pyrone

In this detailed description reference will first be made to the treatment of beef, such as meat from the round of beef. Pieces of meat from the beef round may first be ground by passing them through a grinder having a plate with ⅛ inch openings in accordance with the usual practice for preparing ground beef. To a quantity of the ground beef we may add the 5-hydroxy-2-(hydroxymethyl)-4-pyrone, and mix this thoroughly with the ground meat. The minimum amount of this compound to be effective for retarding color change has been found to be about 0.01 percent by weight of the meat. About 0.05 percent has been found to give about a maximum effect, but more may be added. This compound may be incorporated in the meat in an amount within the range of from 0.01 to 0.50 percent by weight. One of the advantages in the use of this compound is that it gives little or no odor even when added in higher amounts. Further the meats when treated with this special compound have substantially no odor other than the natural odor of the meat either before or after cooking.

In the foregoing description we have referred to the treatment of ground beef with our special pyrone compound. After this compound has been incorporated in the ground beef by thorough mixing the meat may be stored and handled in the usual way. For example, the meat may be divided into portions or patties and these placed in refrigerated storage or in the usual refrigerated display cases. The portions may be wrapped in film which will hold the portions together, but in the usual practice the film is not impervious to the transmission of oxygen in the air. According to the prior practice the color of the ground beef patties change from its bright red color to a reddish brown in 1 or 2 days, but in the case of ground beef containing our special pyrone compound this change in color occurs only after about 4 or 5 days.

In some cases we have found that by using our process the development of brown color may be avoided for a period of 16 days or more while the meat is stored under the usual conditions of refrigeration.

The same practice as above described may be followed in connection with ground pork or ground lamb meats with similar results.

This process is found to be particularly adaptable to pork sausage where sodium chloride or other spice ingredients are included. It is an advantage of our process that it may be utilized along with the additions of sodium chloride and that these additives are compatible and harmonious in their combined function in either beef, pork, or lamb, particularly so with pork sausage.

In the case of cuts of meats such as beef steaks or pork chops which are not ground or otherwise comminuted, the special pyrone compound may be applied to the surface of the meat cuts in the form of an aqueous solution. This special compound is soluble in water at least to some extent and it is satisfactory that the aqueous solution contain of the order of 0.05 to 1 percent by weight of the compound. The aqueous solution may be applied to the meat surface in any desired way such as by spraying the solution onto the meat surface. The special pyrone compound then absorbs into the meat. Such application may continue until the meat contains the compound in a concentration of at least 0.01 percent of the weight of the meat.

Following are specific examples in which our process is utilized and the product tested as to color change:

EXAMPLE I

Meat from the round of beef was ground in the usual way and 0.2 percent by weight, based on the weight of the meat, of 5-hydroxy-2-(hydroxymethyl)-4-pyrone was mixed thoroughly into one portion of the meat and another portion was used as control. The meat was then formed into patties and placed into a retail display case. The meat had a pH of 5.8 and was wrapped in Reynold's HSM-FM film. The meat of each sample was examined as to color when placed in the case and also at the end of each of 7 succeeding days. The following observations were made:

| Treatment | Concentration % | Color Observation Days in retail display case | | | | | |
|---|---|---|---|---|---|---|---|
| | | 0 | 1 | 2 | 5 | 6 | 7 |
| Control, ground beef | — | bright red | bright red | brown-red unacceptable | dark brown unacceptable | dark brown unacceptable | dark brown unacceptable |
| Ground beef + 5-hydroxy-2-(hydroxymethyl)-4-pyrone | 0.2% | bright red | bright red | bright red | bright red | bright red | red-brown, acceptable |

EXAMPLE II

Samples of ground beef having a fat content of 24.7% were prepared as in Example I with one of the samples being treated with 5-hydroxy-2-(hydroxymethyl)-4-pyrone. The following observations were made:

| Treatment | Concentration % | Color Observation Days in retail display case | | | | | |
|---|---|---|---|---|---|---|---|
| | | 0 | 1 | 2 | 3 | 4 | 5 |
| Control, ground beef, pH 5.4 neutral odor | — | bright red | brown-red | brown | brown | brown | brown |
| Ground beef + 5-hydroxy-2-(hydroxymethyl)-4-pyrone, pH 5.4 neutral odor like control | 0.1% | bright red | bright red | red, trace brown | red, trace brown | red, trace brown | red, trace brown |

EXAMPLE III

Samples were prepared as in Example I except that 0.05% of 5-hydroxy-2-(hydroxymethyl)-4-pyrone was incorporated into one of these samples, the other being utilized as a control. Observations were made as follows:

| Treatment | Concentration | Color Observation Days in retail display case | | | | |
|---|---|---|---|---|---|---|
| | | 0 | 1 | 2 | 3 | 4 |
| Control, ground beef pH 5.6 | — | bright red | brown-red | brown | brown | brown |
| Ground beef + 5-hydroxy-2-(hydroxymethyl)-4-pyrone, pH 5.6 | 0.05% | bright red | red, trace brown | brown red | brown | brown |

EXAMPLE IV

To demonstrate the effect of different amounts of the special pyrone compound we prepared ground beef as in Example I and divided this into five samples, one of which was reserved for control. In the other samples there was incorporated respectively 0.01 percent, 0.05% percent, 0.10 percent and 0.20 percent by weight of 5-hydroxy-2-(hydroxymethyl)-4-pyrone, and each of these samples were stored at 38°F.. The following observations were made:

| Treatment | Initial pH | Color Observation Days in retail display case | | | | |
|---|---|---|---|---|---|---|
| | | 0 | 1 | 2 | 3 | 4 |
| Control | 5.45 | bright red | red, trace brown | red | brown | brown |
| 0.01% | 5.45 | bright red | red | red | brown-red | brown |
| 0.05% | 5.40 | bright red | bright red | red | red, trace brown | red-brown |
| 0.10% | 5.42 | bright red | bright red | bright red | red | red, trace brown |
| 0.20% | 5.38 | bright red | bright red | bright red | red | red |

EXAMPLE V

To test the process as to whole cuts of meats we selected strip beef steaks. These steaks were ⅝ inch thick and were dipped into a 1 percent water solution of 5-hydroxy-2-(hydroxymethyl)-4-pyrone for 1 minute and then drained for 20 seconds. Other steaks were handled as control. Following are the tabulated results:

| Treatment | Percent weight gain | Percent Compound on Steak | Initial Color | Days in retail display case 3 | 4 | 5 |
|---|---|---|---|---|---|---|
| Control | 1.5 | — | bright red | brown-red | brown | brown |
| 5-hydroxy-2-(hydroxymethyl)-4-pyrone | 1.7 | .017 | bright red | red, trace brown | red-rown | brown-red |

EXAMPLE VI

To demonstrate the improved process with respect to fresh pork we have selected two samples of ground pork and used one as a control; in the other we incorporated 0.1 percent by weight of 5-hydroxy-2-(hydroxymethyl)-4-pyrone, with the following results:

| Treatment | Concentration (%) | Exterior color in raw ground pork 0 | 1 | 2 | 5 |
|---|---|---|---|---|---|
| Control pork | — | pink-red | light brown-red | light brown-red | brown |
| Pork + 5-hydroxy-2-(hydroxymethyl)-4-pyrone | 0.1 | light red | light red | light red | pink brown |

EXAMPLE VII

To demonstrate the effect of the special pyrone compound in the treatment of fresh pork including sodium chloride we have selected two samples; one was used as control and to this was added 2 percent of sodium chloride. To the other sample there was added 2 percent sodium chloride and 0.1 percent of 5-hydroxy-2-(hydroxymethyl)-4-pyrone. The samples were wrapped in film and put in a refrigerated display case and observations taken at the time the samples were admitted to the case and also at the end of 1, 2 and 5 days. The following observations were made:

| Treatment | Concentration (%) | Exterior color of new ground pork Days 0 | 1 | 2 | 5 |
|---|---|---|---|---|---|
| Control, pork + 2% sodium chloride | — | red | brown-red | brown unacceptable | brown unacceptable |
| Pork + 2% sodium chloride + 5-hydroxy-2-(hydroxymethyl)-4-pyrone | 0.1% | red | dark red | dark red-brown acceptable | dark red-brown acceptable |

EXAMPLE VIII

To further demonstrate the effect of the special pyrone compound in the treatment of sausage meats two samples of pork sausage meats were selected one being used as control and to the other was added 0.25 percent of 5-hydroxy-2-(hydroxymethyl)-4-pyrone. Each of the samples were wrapped in oxygen permeable PVC-FM film, manufactured by the Reynolds Metal Company and placed in a display case. Observations were made as follows:

| Treatment | Concentration (%) | Exterior color of pork sausage Days in retail display case 0 | 2 | 4 | 5 |
|---|---|---|---|---|---|
| Control, pork sausage | — | bright red | red-brown | brown | brown |
| Pork sausage + 5-hydroxy-2-(hydroxymethyl)-4-pyrone | 0.25 | bright red | red | red | red |

EXAMPLE IX

To determine the effect of addition of 5-hydroxy-2-(hydroxymethyl)-4-pyrone to pork sausage meats on the flavor of the meat, samples were prepared, some of which were held as control and others of which were treated with 0.25 percent of 5-hydroxy-2-(hydroxymethyl)-4-pyrone. The samples were wrapped in film and put in a refrigerated display case and held for seven days in this case. At the end of 7 days storage the samples were submitted to a panel of seven persons for testing as to flavor. The results of this test are as follows:

| Panelist | Pork Sausage Control | | Pork Sausage + 0.25% 5-hydroxy-2-(hydroxymethyl)-4-pyrone | |
|---|---|---|---|---|
| | Odor | Flavor | Odor | Flavor |
| A | fair | fair | acceptable | acceptable |
| B | acceptable | very slightly sour | acceptable | good |
| C | acceptable | slightly sour | acceptable | slightly pleasant |
| D | acceptable | acceptable | acceptable | acceptable |
| E | acceptable | bitter, not acceptable | acceptable | acceptable |
| F | acceptable | slight off-flavor | acceptable | acceptable |
| G | acceptable | slightly sour, slightly rancid | acceptable | acceptable |

EXAMPLE X

Samples of pork sausage meat were selected one of which was retained as a control and to the other was added 0.25 percent of 5-hydroxy-2-(hydroxymethyl)-4-pyrone. These samples were each stuffed into edible collagen casings and placed in a retail display case. Observations were made when the samples were placed into the case and at the end of 3, 5, 6 and 7 days storage. The results are described in the following table:

| Treatment | Exterior color of pork sausage Days in retail display case | | | | |
|---|---|---|---|---|---|
| | 0 | 3 | 5 | 6 | 7 |
| Control, pork sausage | red | red, trace brown | brown, trace red undesirable | brown | brown |
| Pork sausage + 0.25% 5-hydroxy-2-(hydroxymethyl)-4-pyrone | bright red | bright | red | red | red-brown |

EXAMPLE XI

To demostrate the effect of incorporating the special pyrone compound into meats which have been frozen pork sausage chubs which had been frozen for 6 weeks were selected. Samples were taken one of which was used as a control and to the other sample there was added 0.25 percent by weight of 5-hydroxy-2-(hydroxymethyl)-4-pyrone. The chub samples which had been wrapped in oxygen permeable film, were placed in a refrigerated retail display case. Observations as to color were made as to both the exterior and the interior of the samples and these are given as follows:

| Treatment | Color of sausage after defrosting for 3 days | |
|---|---|---|
| | Exterior | Interior |
| Control, pork sausage | brown | red |
| Pork sausage + 0.25% 5-hydroxy-2-(hydroxymethyl)-4-pyrone | red | red |

Although we have described in detail only certain embodiments of our invention, it is to be understood that the invention may be practiced in many ways and many changes may be made without departing from the spirit of the invention and all within the scope of the appended claims.

We claim:

1. In a process for preserving the bright red color of red meat the steps of treating said meat with from 0.01 to 0.50 percent by weight of 5-hydroxy-2-(hydroxymethyl)-4-pyrone and storing said meat with said compound incorporated therein for a period of at least one day whereby the bright red color of the red meat is preserved.

2. A process as set forth in claim 1 which includes the step of comminuting said meat and incorporating said compound into the comminuted meat.

3. A process as set forth in claim 1 which includes the step of storing said meat with said compound incorporated therein for a period of at least 2 days.

4. A process as set forth in claim 2 which includes the step of forming said comminuted meat having said compound therein to a prescribed shape, and thereafter storing said meat for a period of at least two days.

5. A process as set forth in claim 1 wherein said compound is incorporated into said meat in the amount of 0.01 to 0.2 percent by weight based on the weight of said meat.

6. A process as set forth in claim 1 wherein said compound is incorporated into said meat in the amount of 0.01 0.05 percent by weight based on the weight of said meat.

7. A process as set forth in claim 1 wherein said compound is applied in aqueous solution to the surface of said meat.

* * * * *